United States Patent [19]
Voss

[11] Patent Number: 5,064,366
[45] Date of Patent: Nov. 12, 1991

[54] BLOW MOLD

[75] Inventor: Hermann Voss, Löhrsweg, Fed. Rep. of Germany

[73] Assignee: Nissei ASB Machine Co., Ltd., Nagano, Japan

[21] Appl. No.: 523,387

[22] Filed: May 15, 1990

[51] Int. Cl.$^5$ .............................................. B29C 49/56
[52] U.S. Cl. ................................ 425/541; 425/450.1; 425/451.4; 425/451.9
[58] Field of Search .................. 425/541, 450.1, 451.4, 425/451.9, 525

[56] References Cited

U.S. PATENT DOCUMENTS

| | | | |
|---|---|---|---|
| 3,877,861 | 4/1975 | Kiefer et al. | 425/541 |
| 4,120,636 | 10/1978 | Appel et al. | 425/541 |
| 4,310,282 | 1/1982 | Spurr et al. | 425/533 X |
| 4,437,825 | 3/1984 | Harry et al. | 425/541 X |
| 4,579,519 | 4/1986 | Maser et al. | 425/541 |
| 4,769,206 | 9/1988 | Reymann et al. | 425/525 X |
| 4,822,275 | 4/1989 | Voss et al. | 425/541 X |
| 4,834,642 | 5/1989 | Voss et al. | 425/541 X |

FOREIGN PATENT DOCUMENTS

| | | |
|---|---|---|
| 3336071 | 4/1985 | Fed. Rep. of Germany . |
| 3729451 | 6/1988 | Fed. Rep. of Germany . |
| 3732342 | 8/1988 | Fed. Rep. of Germany . |
| 2457171 | 12/1980 | France . |
| 2552709 | 4/1985 | France . |
| 1101137 | 4/1989 | Japan . |

Primary Examiner—Richard L. Chiesa
Attorney, Agent, or Firm—Oliff & Berridge

[57] ABSTRACT

A blow mold includes first and second mold halves pivotally mounted about a pivot shaft and including boundary faces which engage with each other to form an internal chamber used to blow mold a hollow article. A locked member is located on the end of the first mold half opposite to the pivot shaft and is for locking relative to the second mold half when the boundary faces are engaged by each other. A locking member is movably supported by the end of the second mold half opposite to the pivot shaft, and is for locking the locked member when the boundary faces are brought into contact with each other and to unlock the locked member before the boundary faces are separated apart from each other. A mold drive/control mechanism responsive to the driving force from a single power source controls a) an operative step between the pivotal movement of the first and second mold halves toward each other and the subsequent locking motion of the locking member, and b) an operative step between the unlocking motion of the locking member and the pivotal movement of the first and second mold halves apart from each other. The mold drive/control mechanism can realize the harmonization of the pivotal movement of the first and second mold halves with the lock/unlock action of the locking member and the smooth drive of the blow mold in a positive and rapid manner.

14 Claims, 9 Drawing Sheets

BLOW MOLD

BACKGROUND OF THE INVENTION

1. Field of the Invention

The present invention relates to a blow mold comprising two mold halves pivotable about a common pivot axis and adapted to form an internal chamber for making a bottle and means for locking the mold halves relative to each other in their closed position.

2. Description of Related Art

Stretch blow molding machines utilizing such a blow mold are disclosed, for example, in West Germany Patent No. 3,336,071 or Japanese Laid-Open Patent Application No. 101137/1989. Since the two mold halves of such a blow mold are opened and closed in a pivotal motion, they can be rapidly closed after a preform has been inserted into the interior of the blow mold and rapidly opened after a blow molded article has been formed. This is very advantageous in that the cycle of blow molding can be shortened. The speed of operation in the stretch blow molding machines thus accomplished depends exclusively on the speed of each of the moving steps, that is, a step at which the mold halves are moved toward each other and locked relative to each other to close the blow mold and another step at which the mold halves are unlocked from each other and moved away from each other to open the blow mold.

In the conventional stretch blow molding machines disclosed in the aforementioned known literatures, the pivotal motion and locking/unlocking motion of the two mold halves were performed by the transmission of driving forces thereto from separate power sources. In such a case, these different motions were difficult to be harmonized with each other. It was particularly difficult to provide a harmonization between the movement of the mold halves into their closed position and the subsequential locking action on the mold halves and between the unlocking action on the mold halves and the subsequential movement of the mold halves into their open position.

SUMMARY OF THE INVENTION

It is therefore an object of the present invention to provide a blow mold of the above type which can be closed and opened more smoothly and rapidly by providing a harmonization between the pivotal and locking motions required to close the mold halves and between the unlocking and pivotal motions required to open the mold halves.

This object is accomplished, in accordance with the present invention, by providing a mold drive/control mechanism which receives a driving power transmitted from a single power source to control the pivotal closing and subsequent locking motions of the first and second mold halves and also to control the unlocking and subsequent pivotal opening motions of the first and second mold halves.

Since actuated by the driving force from the single power source, the mold drive/control mechanism can control the pivotal motion of the mold halves and the locking/unlocking motion of the locking member in a predetermined positive timing and yet in a smooth and rapid manner. Thus, the control process for the interrelated motions of the mold halves in the blow mold can be performed in an optimum sequence without creation of undesirable combination of various motions or interference between the components being moved.

For such a purpose, this mold drive/control mechanism comprises:
- a control slider reciprocated by means of a drive;
- a mold motion controlling cam formed on the camming face of said control slider;
- a lock/unlock controlling cam formed on the camming face of the control slider;
- a mold drive cam follower driven by the mold motion controlling cam to produce an actuating force for pivotally moving first and second mold halves into their closed and opened positions; and
- a lock/unlock drive cam follower driven by said lock/unlock controlling cam to produce an actuating force for moving locking member into their locking and unlocking directions, whereby a mechanical engagement can be performed to provide a positive operation.

The mold drive/control mechanism can be made compact by that the camming face of said control slider on which the mold motion controlling cam is formed is positioned concentrically about a pivot shaft. In such a case, the mold motion control cam consists of first and second cam portions for pivotally moving the first and second mold halves, respectively. The first and second cam portions are so arranged that they are positioned to have a minimum spacing therebetween when the first and second mold halves are pivotally moved to their opened position and that there is provided a maximum spacing between the first and second cam portions when the first and second mold halves are brought into contact with each other.

There is also provided a lock/unlock drive mechanism for the locking member, which comprises a lever adapted to be pivoted following the movement of the lock/unlock drive cam follower. When the pivoted lever engages, at its distal end, with said locking member, the latter can be slidably moved in its locking and unlocking directions, respectively.

In order to form a bottom wall in a hollow article formed by the blow mold, a bottom mold may be provided at one end of the pivot shaft for the first and second mold halves so as to form a portion of the internal chamber in the blow mold.

The bottom mold is preferably connected with a bottom mold drive/control mechanism adapted to receive a driving power from said power source such that the bottom mold can be vertically moved along said pivot shaft. The movability of the bottom mold increases the number of types of hollow articles which can be molded by the blow mold according to the present invention. For example, the bottom mold may be used to form a hollow article having a bottom wall which extends inwardly convexly into the internal chamber of the blow mold. In such a case, the bottom mold has a raised portion for forming the inwardly and convexly extending bottom wall in the hollow article.

The bottom mold drive/control mechanism comprises:
- a slider block reciprocatable with the control slider;
- a drive cam formed on the slider block;
- a control cylinder reversibly rotated by the reciprocation of the slider block and having a cam follower driven by the drive cam;
- a bottom mold drive/control cam formed on the camming face of the control cylinder; and a bottom mold driving lever having a pivot point at its middle between the opposite ends and having a cam follower formed thereon at one end and driven by the bottom mold drive/control cam with the opposite end being vertically movable with the bottom mold.

If pressure faces sloped with the same angle are formed respectively on the bottom mold and the first and second mold halves, the bottom mold can be automatically centered under the action of the pressure faces engaging with each other when the internal chamber is defined by the first and second mold halves together with the bottom mold.

DETAILED DESCRIPTION OF THE PREFERRED EMBODIMENT

Figure 1:
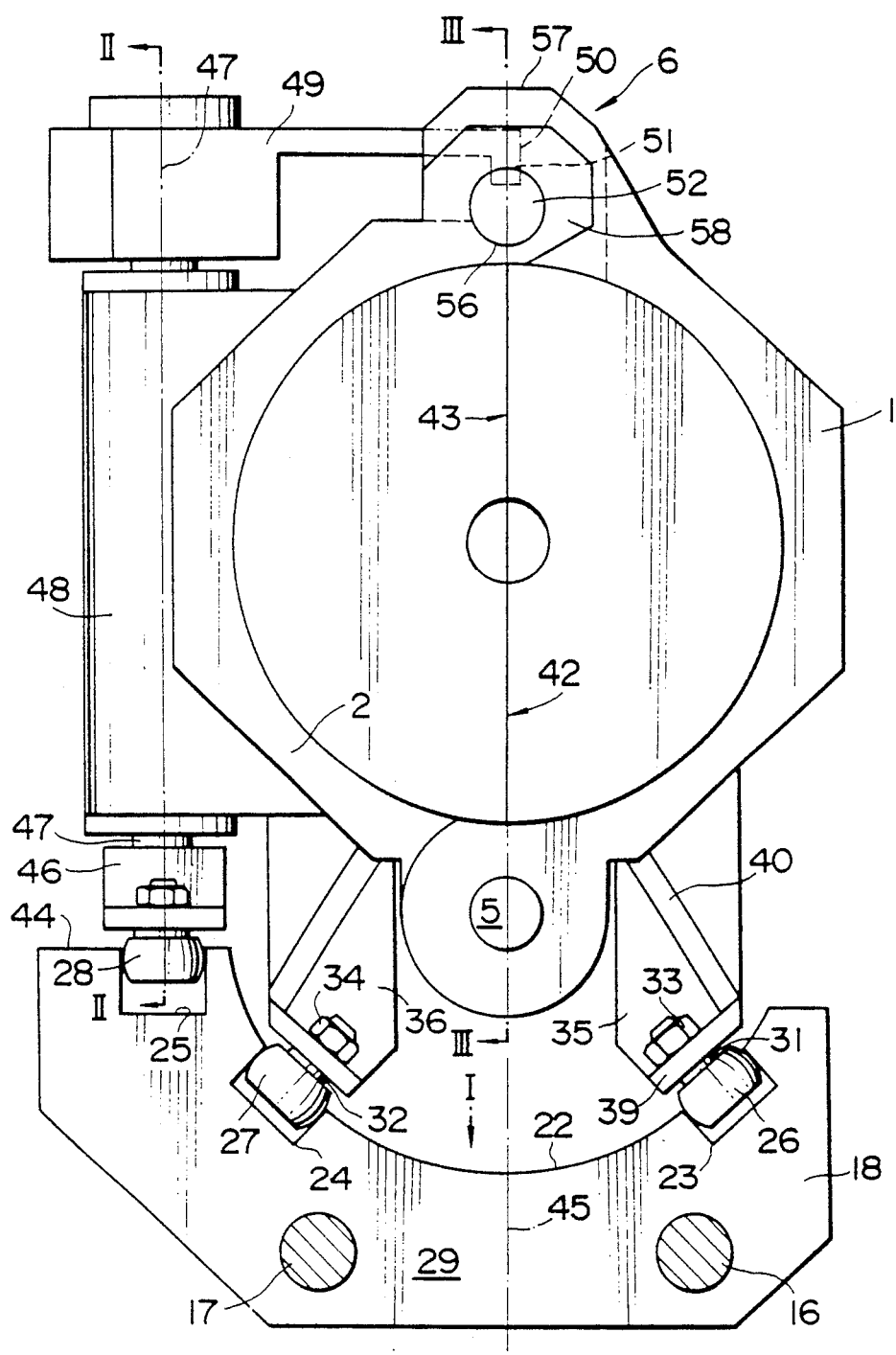
FIG. 1 is a plan view of a blow mold constructed in accordance with one embodiment of the present invention, showing the blow mold in its closed position.

The present invention will now be described in details with reference to an embodiment thereof illustrated in the drawings.

Figure 2:
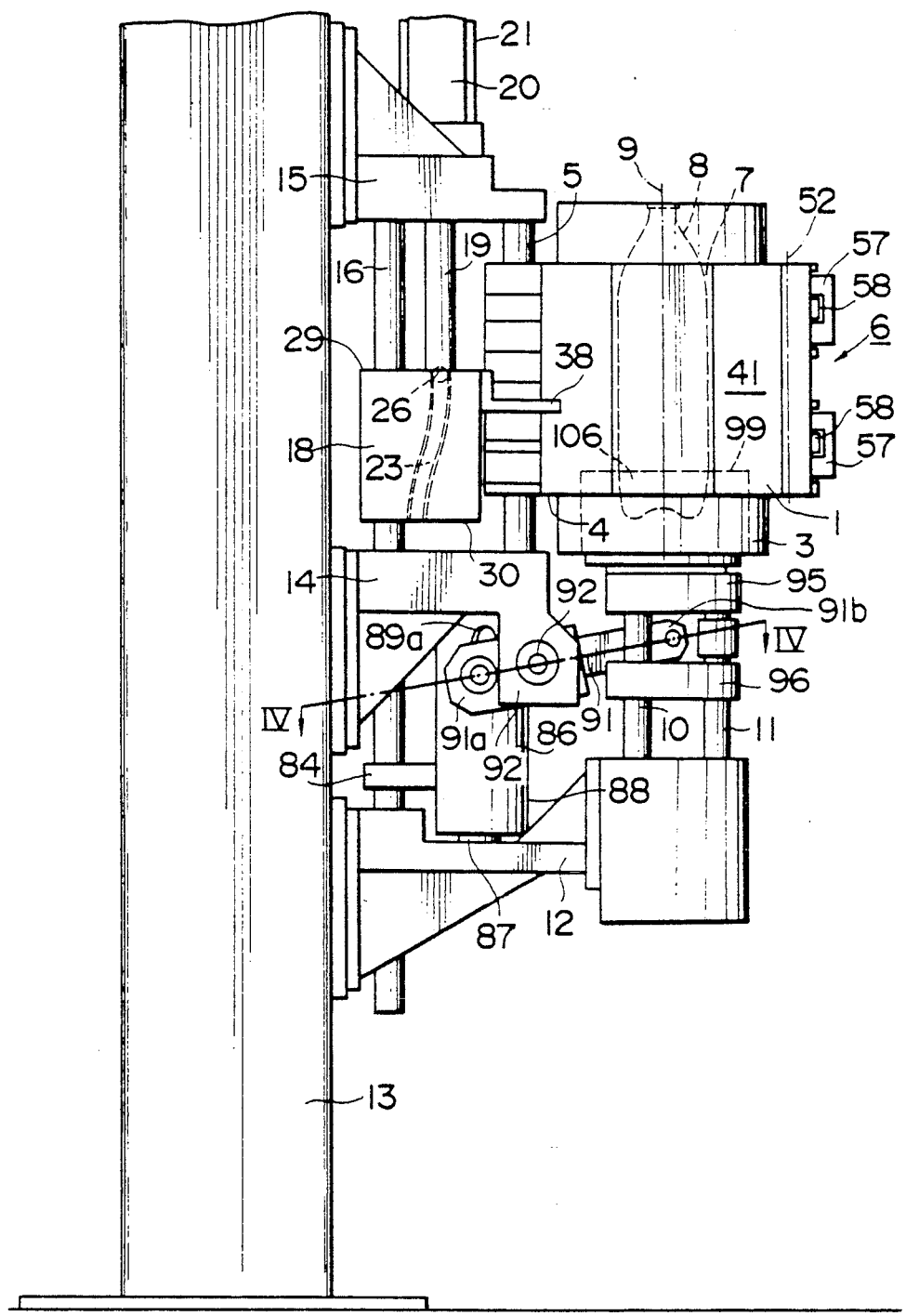
FIG. 2 is a side view of the blow mold in its closed position.

Referring now to FIGS. 1 and 2, there is shown a blow mold constructed in accordance with the present invention, which generally comprises a first mold half 1, a second mold half 2 and a bottom mold 3. As shown in FIG. 2, the bottom mold 3 extends into the interior of the blow mold beyond the lower ends 4 of the first and second mold halves 1 and 2. The mold halves 1 and 2 are pivotably supported on a common pivot shaft 5 such that the mold halves can be pivoted toward and away from each other.

There is provided locking means 6 for locking the first and second mold halves 1 and 2 relative to each other, the locking means 6 being located at a position diametrically opposite to the pivot shaft 5. In their locked position, the first and second mold halves 1 and 2 define an internal chamber 7 therebetween, which is used to form a hollow article 8 from a preform (not shown) in the stretch blow molding process. The internal chamber 7 has a central axis 9 extending in the vertical direction, to which the pivot shaft 5 extends parallel.

The bottom mold 3 is supported by guide bars 10 and 11 such that the bottom mold 3 can be moved axially along the central axis 9 of the internal chamber 7. The guide bars 10 and 11 extend substantially parallel to the central axis 9 and are movably supported by a third bracket 12. The third bracket 12 is fixedly mounted on a stationary column 13 which also fixedly supports two other brackets 14 and 15 spaced axially away from each other. These brackets 12, 14 and 15 longitudinally movably support two parallel tie rods 16 and 17 spaced away from each other and extending parallel to the pivot shaft 5. The tie rods 16 and 17 fixedly support a control slider 18 which is in turn connected with a hydraulic piston 20 through a piston rod 19. The hydraulic piston 20 is slidably received within a hydraulic cylinder 21 which is fixedly mounted on the first bracket 15.

The pivot shaft 5 is spanned between and journalled at its opposite ends by the first and second brackets 15 and 14. The control slider 18 coaxially surrounds the pivot shaft 5 and is movable between the brackets 14 and 15. The control slider 18 includes a camming face 22 formed therein at the inner wall facing the pivot shaft 5. The camming face 22 is formed with three control cams (camming grooves) 23, 24 and 25 extending along the length of the control slider 18. Each of the control cams 23, 24 or 25 rotatably support the corresponding one of driven rollers 26, 27 and 28. As best seen from FIG. 5, two of the control cams 23 and 24 are spaced apart from each other with the maximum spacing at the end face 29 of the control slider 18 closer to the first bracket 15 while the control cams 23 and 24 are spaced apart from each other with the minimum spacing at the end face 30 of the control slider 18 opposite to the end face 29 thereof. Each of the control cams 23 and 24 is formed to be of a gently elongated S-shaped configuration between the end faces 29 and 30 of the control slider 18. Each of the driven rollers 26 and 27 is slidably guided within the respective one of the S-shaped control cams 23 and 24 as the control slider 18 moves on and along the tie rods 16 and 17. Upon movement of the control slider 18, the driven rollers 26 and 27 are laterally moved toward each other as the control slider 18 moves away from the first bracket 15 toward the second bracket 14. As the control slider 18 moves in the opposite direction, the driven rollers 26 and 27 are moved away from each other.

Figure 3:
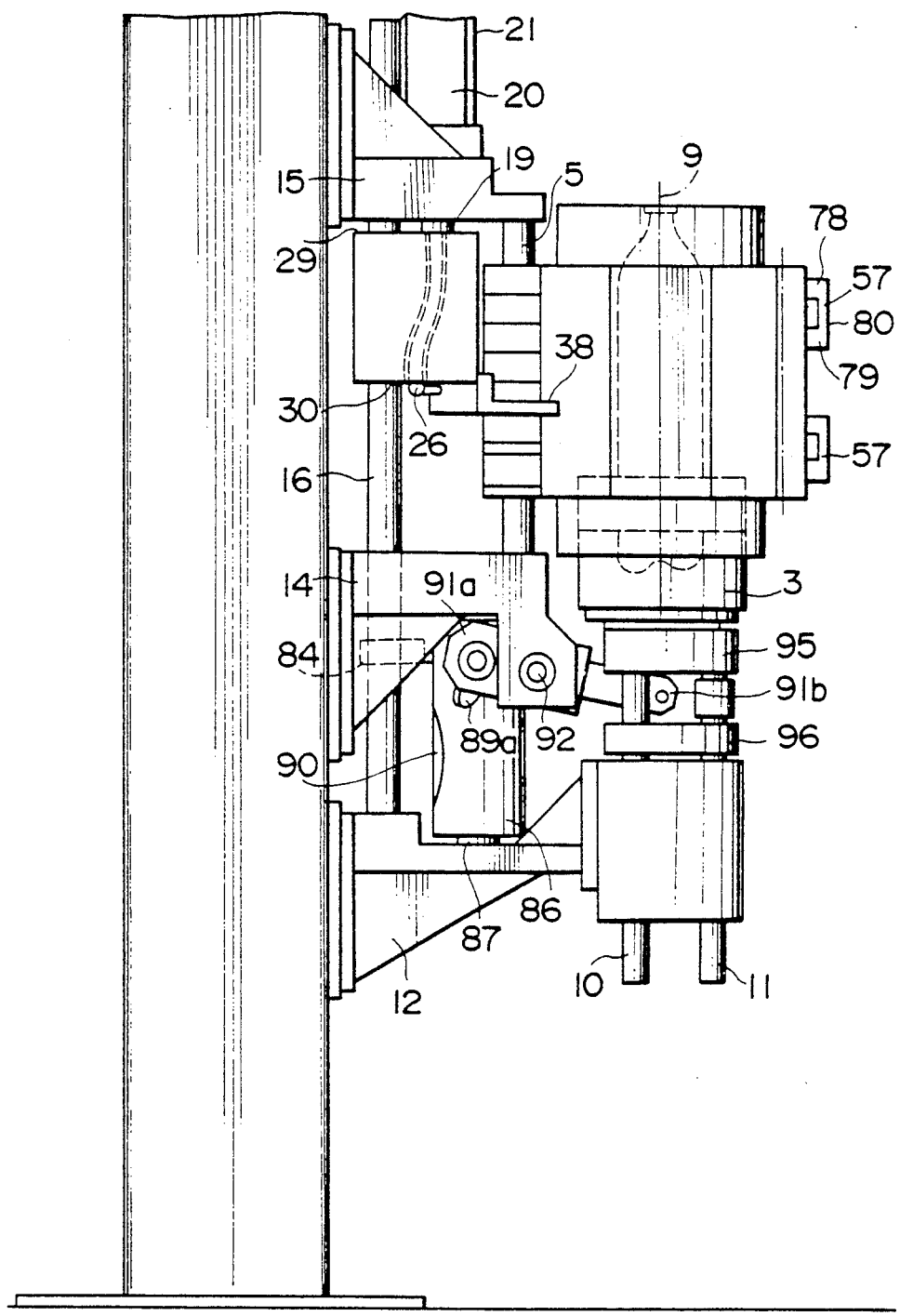
FIG. 3 is a side view of the blow mold in its opened position.
Figure 4:
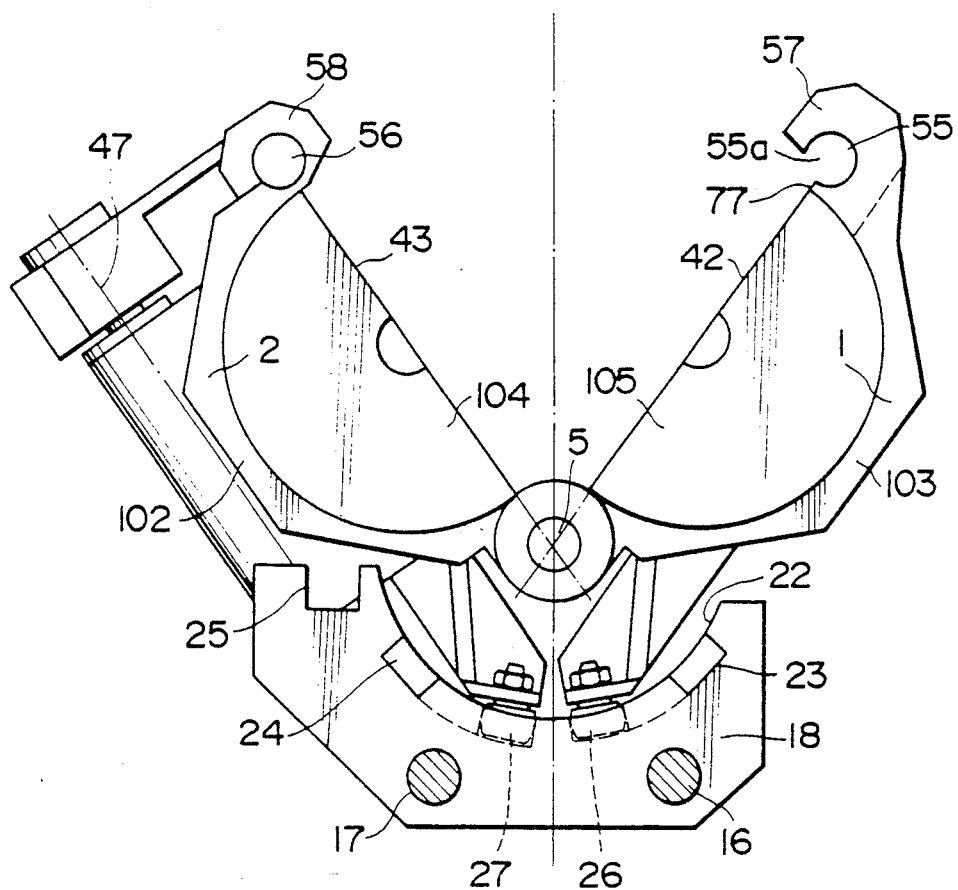
FIG. 4 is a plan view of the blow mold in its opened position.

As shown in FIG. 1, each of the driven rollers 26 and 27 is rotatably supported by one of shafts 31 and 32 which in turn are mounted on driven bodies 35 and 36 through bolt means 33 and 34, respectively. Each of the driven bodies 35 and 36 is an L-shaped member as shown by 38 in FIG. 2, its shorter leg 39 being connected with the corresponding one of the driven rollers 26 and 27 through the bolt means 33 or 34. The longer leg 40 of each of the L-shaped driven bodies 35 and 36 is mounted on the outer wall 41 of the corresponding one of the first and second mold halves 1 and 2. In such an arrangement, the movement of the driven rollers 26 and 27 is transmitted to the first and second mold halves 1 and 2 through the driven bodies 35 and 36, such that the first and second mold halves 1 and 2 are pivotably moved about the pivot shaft 5 depending on the direction of movement of the driven rollers 26 and 27. In this case, the control cams 23 and 24 are shaped as follows:

When the driven rollers 26 and 27 are on the side of the end face 29 of the control slider 18 (in the state shown in FIG. 2), the first and second mold halves 1 and 2 are urged against each other at their boundary faces 42 and 43. On the contrary, when the driven rollers 26 and 27 are on the side of the end face 30 (in the state shown in FIG. 3), the first and second mold halves 1 and 2 are separated away from each other to completely open the internal chamber 7 as shown in FIG. 4. The middle portion of each of the control cams 23 and 24 is configured in accordance with the desired motion of the first and second mold halves 1 and 2. In this connection, the first and second mold halves 1 and 2 must be maintained in the closed state until a hollow article 8 is completely formed into the desired and final configuration within the internal chamber 7 of the blow mold. On the other hand, the first and second mold halves 1 and 2 should be moved apart from each other as fast as possible such that the finished hollow article 8 is removed out of the internal chamber 7 and then a new preform is received in the internal chamber 7.

The third control cam 25 extends longitudinally along the side face 44 continuing to the camming face 22 of the control slider 18. The side face 44 also extends substantially perpendicular to each of the end faces 29 and 30 of the control slider 18. As best seen from FIG. 1, a plane including the side face 44 extends substantially perpendicular to a central plane 45 including the opposed boundary faces 42 and 43 of the first and second mold halves 1 and 2. The central plane 45 passes through the central axis 9.

Figure 6:
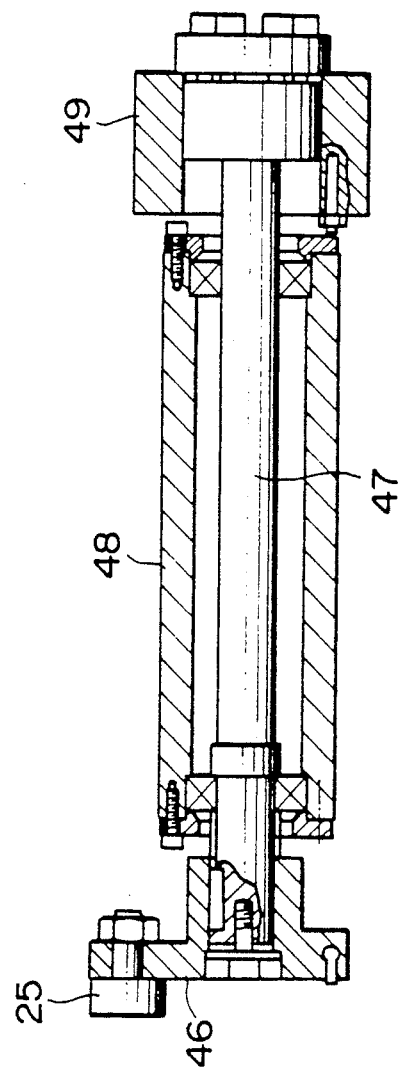
FIG. 6 is a cross-sectional view taken along a line II—II in FIG. 1.

As shown in FIGS. 1 and 6, the driven roller 28 guided by the control cam 25 pivotably supports a connecting lever 46 which is in turn fixedly connected to a pivot shaft 47 at one end. The pivot shaft 47 extends through the marginal region 48 defined by the first and second mold halves 1 and 2 and supports a swingable lever 49 at the end of the pivot shaft 47 remote from the control slider 18. The swingable lever 49 extends toward the locking means 6 in the direction substantially perpendicular to the pivot shaft 47 and includes an outer end 50 remote from the pivot shaft 47, which end 50 is configured into a hook as shown by 51 in FIG. 1. The hook-shaped end 50 engages a locking rod 52 in the locking means.

Figure 7:
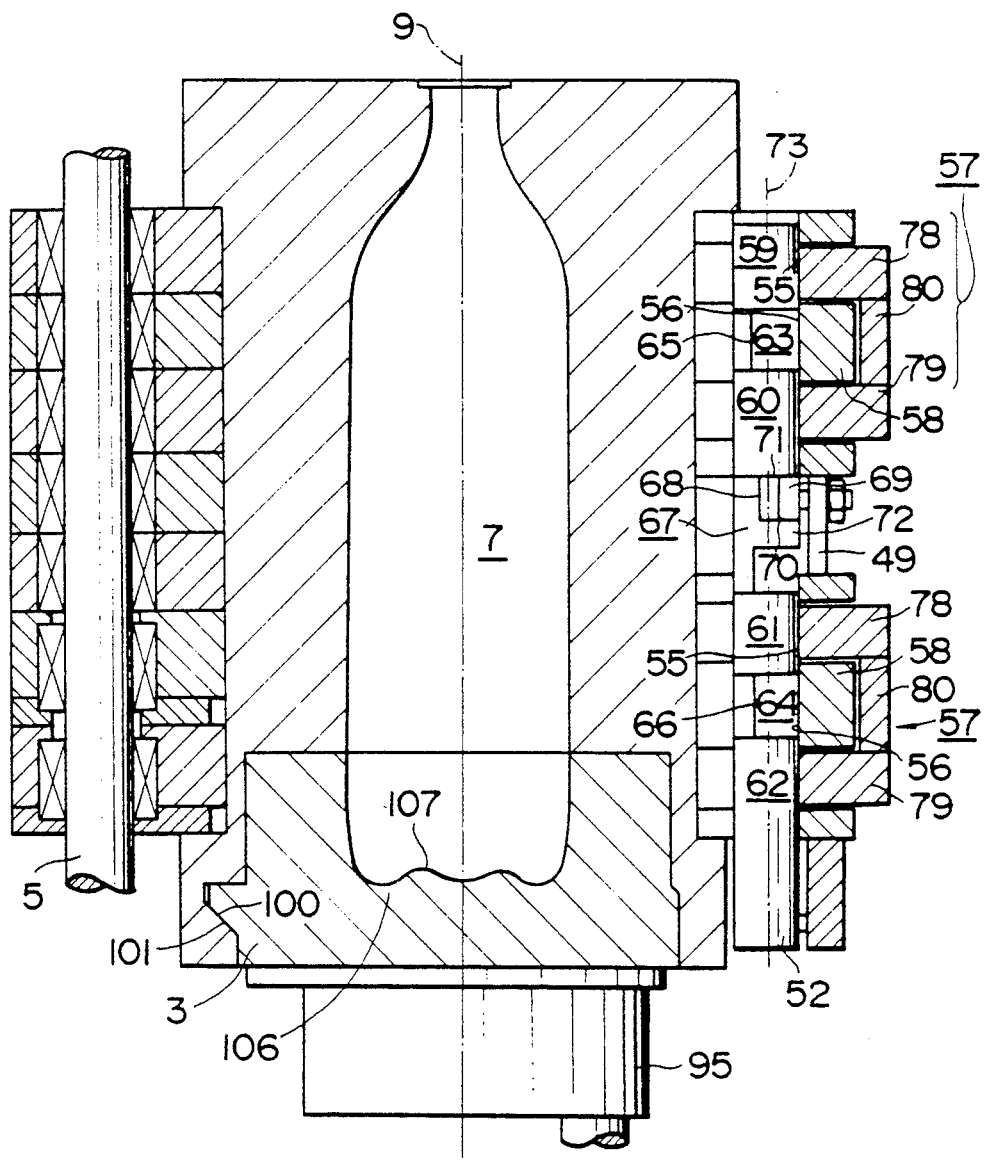
FIG. 7 is a cross-sectional view taken along a line III—III in FIG. 1.

As best seen from FIG. 7, the second mold half 2 includes a pair of ring members 58 spaced longitudinally away from each other on the side of the second mold half 2 opposite to the pivot shaft 5. On the other hand, the first mold half 1 includes a pair of cut-out ring members 57 longitudinally spaced away from each other on the side of the first mold half 1 opposite to the pivot shaft 5, these cut-out ring members 57 acting as locked members. Each of the ring members 58 is formed with an aperture 56 of circular cross-section while each of the cut-out ring members 57 includes an aperture 55 of circular cross-section formed with an arcuate cut-out 55a as shown in FIG. 4. These apertures 55 and 56 are located with be aligned to one another in a straight line if the first and second mold halves 1 and 2 are brought into engagement with each other at their boundary faces 42 and 43. The locking rod 52 has a circular cross-section corresponding to the cross-section of the apertures 55 and 56 and vertically slidably extends through the aperture 56 of the second mold half 2. The locking rod 52 includes cylindrical sections 59, 60, 61 and 62 a connecting member 63 or 64 between each adjacent cylindrical sections 59, 60 or 61, 62, each of the connecting members 63 and 64 having a non-cylindrical section 65 or 66. The arcuate cut-out 55a of each cut-out ring members 57 has a dimension corresponding to the non-cylindrical sections 65. Upon pivotal movement of the first and second mold halves 1 and 2 toward each other, therefore, the locking rod 52 will be received in the cut-out ring members 57 within the range defined by the non-cylindrical sections 65 and 66. For such a purpose, the cut-outs 55a are formed within a range 77 in which the end of the first mold half 1 remote from the pivot shaft 5 connects to the cut-out ring members 57 (see FIG. 7).

Between the cylindrical sections 60 and 61 there is further provided a connecting member 67 which has a connecting portion 68 having its external diameter smaller than those of the cylindrical sections 60 and 61. The external diameter of the connecting portion 68 is enough to support a driven roller 69 which is rotatably supported by the end 50 of the swingable lever 49. The driven roller 69 is on one hand in contact with an end face 71 bounding the cylindrical section 60 at the roller face 70 of the driven roller 69 and on the other hand in contact with a driven member 72. The driven member 72 bounds the connecting member 68 on the side opposite to the end face 71. Thus, as the tip 50 of the swingable lever 49 is swung vertically, the locking rod 52 is moved along the longitudinal axis 73 thereof through the driven roller 69.

Each of the cut-out ring members 57 is of U-shaped configuration and comprises two legs 78 and 79 and a coupling iron 80 connecting the legs with each other. When the internal chamber 7 is closed, the legs 78 and 79 of each of the cut-out ring members 57 are aligned with the upper and lower end faces of the corresponding ring member 58. Since these legs 78 and 79 are connected with each other through the coupling iron 80, each of the cut-out ring members 57 is increased in strength. Therefore, the cut-out ring members 57 can be prevented from being deformed even if the locking rod 52 is passed through the apertures 56 and 55 in the ring and cut-out ring members 58 and 57.

When the internal chamber 7 is in its closed position, the cylindrical sections 59, 60, 61 and 62 of the locking rod 52 extend through the region defined by the apertures 55 formed through the legs 78 and 79. In such a case, the cylindrical sections 59, 60, 61 and 62 extend beyond the region defined by the legs 78 and 79 in the direction toward the apertures 56 of the ring members 58 inserted between the legs 78 and 79 in such an extent that the cylindrical sections 59, 60, 61 and 62 rigidly pass through the apertures 56 and 55.

In order to open the internal chamber 7, the swingable lever 49 is pivoted to move the locking rod 52 toward the bottom mold 3 along the longitudinal axis 73 of the locking rod 52 under the action of the driven roller 69. As a result, the cylindrical sections 59, 60, 61 and 62 will be located only within the region represented by the apertures 56 of the ring members 58. At this time, the locking rod 52 can be removed out of the cut-out ring members 57 in the presence of the non-cylindrical sections 65 and 66. The connecting members 63 and 64 on which the non-cylindrical sections 65 and 66 are formed are positioned in the region represented by two legs 79 on the respective cut-out ring members 57. At this time, the locking rod 52 can be separated out of the upper legs 78 while the driven member 72 on the locking rod 52 is positioned within the region defined by the lower legs 78.

Figure 5:
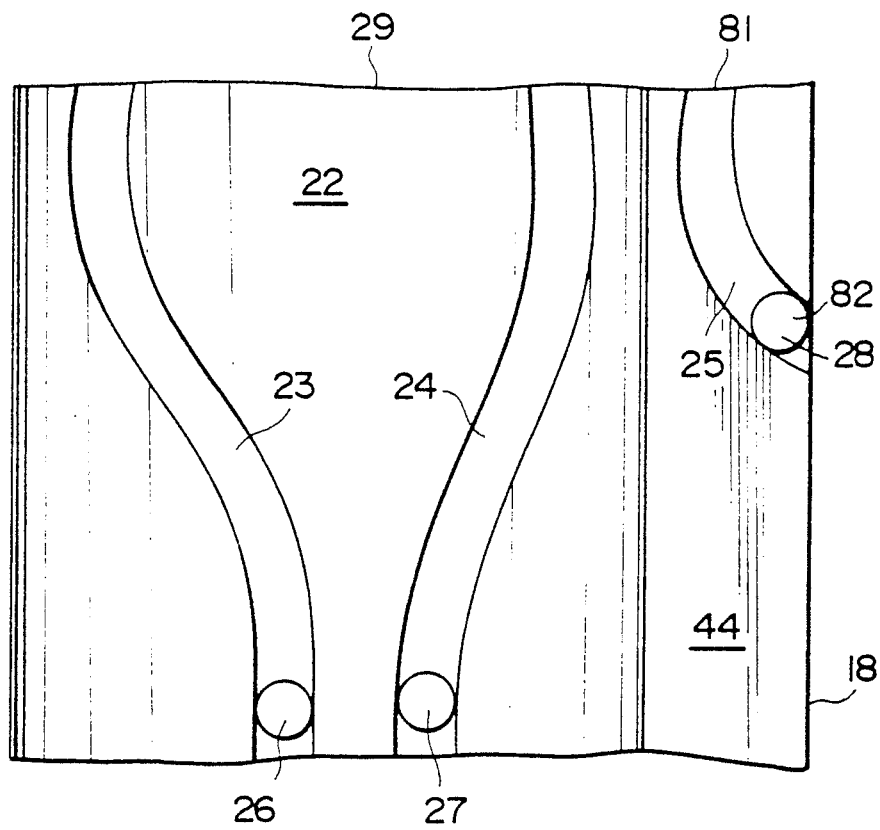
FIG. 5 is an exploded view of the camming face of a control slider as viewed from the direction of arrow I in FIG. 1.

The locking means 6 is actuated into its lock position if the swingable lever 49 is in one of its two pivoted positions and into its unlock position if the swingable lever 49 is in the other pivoted position. The pivotal movement of the swingable lever 49 is caused by the movement of the driven roller 28 within the control cam 25 while twisting the pivot shaft 47. This movement of the swingable lever 49 is controlled by the S-shaped control cam 25 from the unlock position of the locking means 6 within the range of the end face 29 to the lock position of the same below the end face 29. During this process, the driven roller 28 is moved from the start position 81 at the end face 29 to the end position 82, as shown in FIG. 5.

Figure 8:
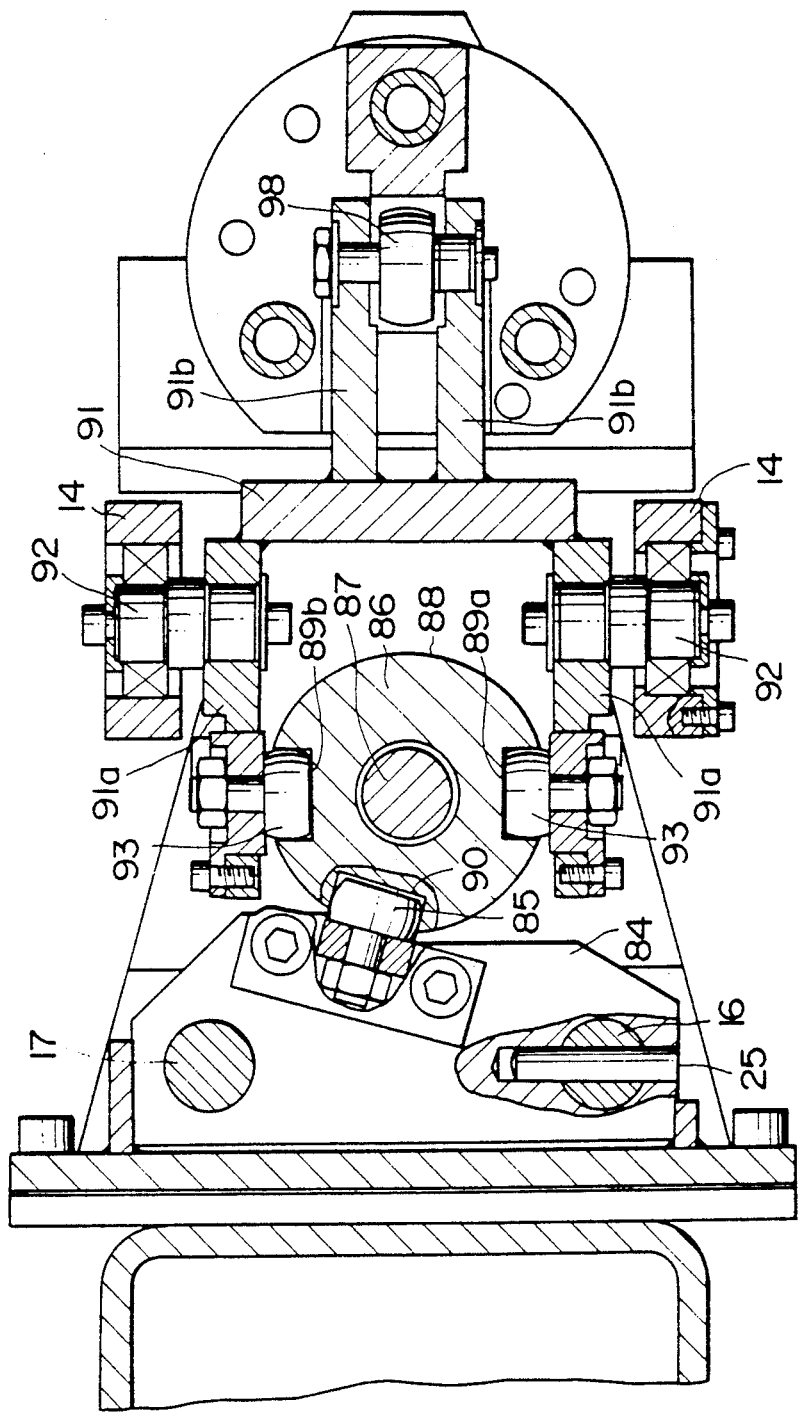
FIG. 8 is a cross-sectional view taken along a line IV—IV in FIG. 2.
Figure 9:
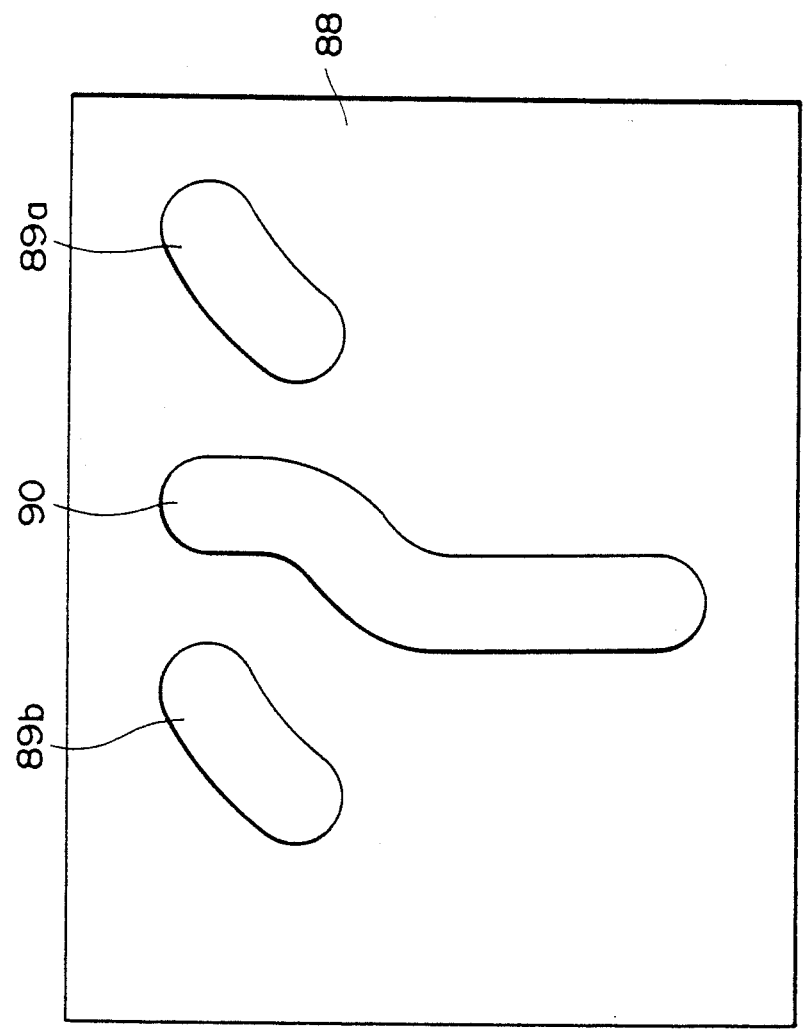
FIG. 9 is an exploded view of a control cylinder.

In addition to the first and second mold halves 1, 2 and the locking means 6, the vertical movement of the bottom mold 3 also is controlled by means of the control slider 18. For such a purpose, an elevator member 84 as slider block is fixedly mounted on the vertical movable tie rods 16 and 17, as shown in FIG. 8. The driven roller 85 is rotatably mounted on the elevator member 84. On the other hand, a shaft 87 is located between the second bracket 14 and the third bracket 12 and rotatably supports a control cylinder 86 which has an outer wall of cylindrical configuration 88 formed with two control cams 89a, 89b and a cam follower 90, all of them being machined into groove configuration, as shown in FIGS. 8 and 9.

The cam follower 90 is engaged by the driven roller 85 which is rotatable relative to the elevator member 84. When the elevator member 84 is vertically moved, the driven roller acts as a drive cam to drive the cam follower 90 which in turn reversibly rotates the control cylinder 86.

When the control cylinder 86 is rotated on the shaft 87 by the movement of the elevator member 84, the control cam 89a and 89b cause a two-armed lever 91 to pivot for vertically moving the bottom mold 3. In such a case, the control cams 89a and 89b are so shaped that they are adapted accurately to the desired movement of the bottom mold 3.

The two-armed lever 91 is fixedly mounted on pivot shafts 92 which are rotatably supported by the second bracket 14. The two-armed lever 91 comprises a first pair of arm sections 91a extending adjacent the opposite sides of the control cylinder 88 and a second pair of arm sections 91b extending toward the outer bottom wall of the bottom mold 3. The pivot shafts 92 are fixedly mounted on the first pair of arm sections 91a at their proximal ends. The distal ends of the first pair of arm sections 91a rotatably support driven rollers 93 which engage in the control cams 89a and 89b on the control cylinder 88, respectively. On the other hand, a driven roller 98 is rotatably supported between the second pair of arm sections 91b at their distal ends. The driven roller 98 is located between two blocks 95 and 96 which are fixedly mounted on the guide bars 10 and 11 vertically movable together with the bottom mold 3 and spaced vertically apart from each other. Between the two blocks 95 and 96, there is provided a member (not shown) contacting the driven roller 98 at its upper and lower sides. Thus, the driven roller 98 will move the bottom mold 3 toward or away from the first and second mold halves 1 and 2, depending on the pivotal movement of the two-armed lever 91. The bottom mold 3 can be moved at very increased speed since the movement of the bottom mold 3 is performed relating to the configuration of the control cams 89a and 89b.

When the bottom mold 3 is moved upwardly, it is snugly fitted into a bottom opening 99 defined by the lower ends of the first and second mold halves 1 and 2 to form the internal chamber 7 therewith. At this time, the bottom mold 3 can be moved very slowly into the bottom opening 99 by suitably selecting the configuration of the control cams 89a and 89b. Thus, the bottom opening 99 can be prevented from being damaged by the bottom mold 3 being moved thereinto. The bottom opening 99 includes a pressure sloped face 100 formed on the bottom mold 3 as shown in FIG. 1 and pressure faces 101 formed on the mold halves 1 and 2 with the same angle as that of the pressure face 100. When these pressure faces 100 and 101 are brought into surface contact with each other on moving the first and second mold halves 1 and 2 to their closed position, the bottom mold 3 can be self-centered in the bottom opening 99 under pressure.

Each of the first and second mold halves 1, 2 has a support frame 102 or 103 for connecting each of the cut-out ring members 57 with the corresponding one of the ring members 58. Each of the support frames 102 or 103 includes a build-in element 104 or 105 mounted therein. The built-in elements 104 and 105 defines an internal chamber 7 of desired hollow configuration. Depending on the configuration of an hollow article 8 to be blow molded, various shapes of built-in elements 104 and 105 will be selected and mounted on the support frames 102 and 103. The bottom mold 3 also includes a mold member 106 mounted thereon and having its configuration selected depending on that of the bottom mold 3. Since the bottom mold 3 is first removed from the first and second mold halves 1 and 2 in order to remove a finished hollow article 8 out of the internal chamber 7, the mold member 106 may be formed with a raised portion 107 inwardly convexly extending into the internal chamber 7. This enables a hollow container 8 having a concave bottom wall internally extending thereinto to be blow molded. This procedure is advantageous in that a stable bottle with hollow legs can be blow molded in accordance with the principle of the present invention.

In operation, the control slider 18 is first moved toward the first bracket 15 under the action of the piston rod 19. The first and second mold halves 1 and 2 are then moved apart from each other to open the internal chamber 7 defined therebetween. In this position, a preform (not shown) is inserted into the internal chamber 7.

Subsequently, the hydraulic cylinder 21 is reversely energized to cause the piston rod 19 to move the control slider 18 toward the second bracket 14. The driven rollers 26 and 27 are slidably moved within and along the respective control cams 23 and 24 to separate the driven rollers 26 and 27 apart from each other. This movement of the driven rollers 26 and 27 is performed as a pivotal motion about the pivot shaft 5. Due to this pivotal motion, the first and second mold halves 1 and 2 are pivotally brought into contact with each other. The locking rod 52 supported by the ring members 56 on the second mold half 2 is received in the cut-out ring members 55 on the first mold half 1 through the cut-outs 55a thereof. When the boundary faces 42 and 43 of the first and second mold halves 1 and 2 are brought into contact with each other, the apertures 57 and 58 in the cut-out ring members 55 and ring members 56 are aligned together in a straight line. Thus, the locking rod 52 can be moved into its lock position through the pivotal motion of the swingable lever 49.

At the same time, the elevator member 84 is downwardly moved together with the tie rods 16 and 17 to engage the driven roller 85 as a drive cam with the cam follower 90. The engagement of the driven roller 85 with the cam follower 90 causes the control cylinder 86 to rotate about the shaft 87 thereof. The driven rollers 93 supported by the first pair of arm sections 91a in the two-armed lever 91 are moved within the respective control cams 89a and 89b to pivot the two-armed lever 91. Thus, the driven roller 98 supported by the distal ends of the second pair of arm sections 91b will cause the bottom mold 3 to move toward the first and second mold halves 1 and 2 until the bottom mold is fitted into the bottom opening 99. Since such a motion is performed together with the pivotal movement of the first and second mold halves 1 and 2, the internal chamber 7 will be completely defined by the first and second mold halves 1, 2 and the bottom mold 3 on termination of the linear movement of the control slider 18.

After a hollow article 8 has been completely formed, the control slider 18 is returned back to the first bracket 15 through the action of the piston rod 19. All the aforementioned cycle is reversely proceeded under the control of the camming members. In such a manner, any interference will not be created between the movable elements during movement. Further, the movement of the movable elements can be harmonized with one another such that the internal chamber 7 can be more rapidly closed and opened.

What is claimed is:

1. A blow mold comprising:
    first and second mold halves pivotally mounted about a pivot shaft and including boundary faces which engage with each other to form an internal chamber used to blow mold a hollow article;
    locked means on the end of said first mold half opposite to said pivot shaft and positioned to be locked relative to said second mold half when said boundary faces are engaged by each other;
    locking means movably supported by the end of said second mold half opposite to said pivot shaft for locking said locked means when the boundary faces are brought into contact with each other and for unlocking said locked means before said boundary faces are separated apart from each other; and
    mold drive/control means responsive to the driving force from a single power source for controlling the pivotal movement of said first and second mold halves toward each other and the subsequent locking motion of said locking means, said drive/control means further controlling the unlocking motion of said locking means and the pivotal movement of said first and second mold halves apart from each other;
    said mold drive/control means comprising:
        a control slider disposed on an opposite side of said pivot shaft to the area in which said first and second mold halves are opened and closed, said control slider having first and second camming faces and being reciprocated by said power source at a position concentrically about said pivot shaft;
        mold motion control cam means formed on the first camming face of said control slider which has an arcuate configuration concentrically about said pivot shaft;
        lock/unlock control cam means formed on the second camming face of said control slider adjacent to said first camming face thereof;
        mold drive cam follower means driven by said mold motion control cam means to create an actuating force for pivotally moving said first and second mold halves toward and apart from each other; and
        lock/unlock drive cam follower means driven by said lock/unlock control cam means to create an actuating force for locking and unlocking said locking means.

2. A blow mold as defined in claim 1, wherein said mold motion control cam means includes first and second cams each for pivotally moving the corresponding one of said first and second mold halves, said first and second cams being such that they are spaced apart from each other with a minimum spacing when said first and second mold halves are moved apart from each other and such that the first and second cams are spaced apart from each other with a maximum spacing when the first and second mold halves are brought into contact with each other at their boundary faces.

3. A blow mold as defined in claim 1, wherein said locking means comprises a plurality of ring members disposed on the side of said second mold half opposite to said pivot shaft, each of said ring members having an aperture formed therein, and a locking rod axially slidably supported through the apertures of said ring members and including cylindrical and non-cylindrical sections formed therein at different axial positions, and
    wherein said locked means comprises a plurality of cut-out ring members disposed on the side of said first mold half opposed to said pivot shaft, each of said cut-out ring members including a peripheral opening for receiving the corresponding non-cylindrical section of said locking rod before the mold is opened or closed and a centrally positioned opening formed in said cut-out ring member into communication with said cut-out and for receiving the corresponding cylindrical section of said locking member after the mold has been closed,
    whereby said locking rod can be axially slidably moved through the apertures of said ring and cut-out ring members by said driven lock/unlock drive cam follower means, the non-cylindrical sections of said locking rod being located opposite to the cut-outs of the respective cut-out ring members on unlocking while the cylindrical sections of said locking rod being located within the central apertures of the respective cut-out ring members on locking.

4. A blow mold as defined in claim 3, further comprising a swingable lever pivotally moved through the movement of said lock/unlock drive cam follower means, said swingable lever including one end which engages said locking rod to slidably move said locking rod to its lock or unlock position through the apertures of said ring and cut-out ring members.

5. A blow mold as defined in claim 3, wherein each of said cut-out ring members includes two leg portions disposed above and below the corresponding ring member with said peripheral and central openings being formed therein, each of said leg portions having an external dimension larger than that of the corresponding ring member, and a reinforcing portion connecting the two upper and lower leg portions with each other at a position in which they do not interfere with the corresponding ring member.

6. A blow mold as defined in claim 5, further comprising a swingable lever pivotally moved through the movement of said lock/unlock drive cam follower means, said swingable lever including one end which engages said locking rod to slidably move said locking rod to its lock or unlock position through the circular openings of said ring and opened ring members.

7. A blow mold as defined in claim 1, further comprising a bottom mold co-operating with said first and second mold halves at a position adjacent to one end of said pivot shaft to form part of said internal chamber for molding the bottom wall of said hollow article, said bottom mold having a centrally and inwardly raised portion for forming the bottom wall of said hollow article with an internally convex configuration and wherein said bottom mold is connected with bottom mold drive/control means for receiving the driving force from said single power source to move said bottom mold vertically along said pivot shaft.

8. A blow mold as defined in claim 7, wherein said bottom mold and said first and second mold halves have pressure faces sloped substantially with the same angle and wherein when said internal chamber is defined by said first and second mold halves and said bottom mold, said bottom mold is self-centered by bringing said pressure faces into engagement with each other.

9. A blow mold as defined in claim 7, wherein said bottom mold drive/control means comprises:
- a slider block reciprocatable with said control slider;
- a drive cam formed in said slider block;
- a control cylinder having a cam follower driven by said drive cam, said control cylinder being reversibly rotatable through the reciprocation of said slider block;
- a bottom mold drive/control cam formed in the camming face of said control cylinder; and
- a bottom mold drive lever having a pivot point at its middle between the opposite ends, said lever having one end on which a cam follower driven by said bottom mold drive/control cam is formed, the other end of said lever movable vertically with said bottom mold.

10. A blow mold as defined in claim 9, wherein said bottom mold and said first and second mold halves have pressure faces sloped substantially with the same angle and wherein when said internal chamber is defined by said first and second mold halves and said bottom mold, said bottom mold is self-centered by bringing said pressure faces into engagement with each other.

11. A blow mold as defined in claim 3, further comprising a bottom mold co-operating with said first and second mold halves at a position adjacent to one end of said pivot shaft to form part of said internal chamber for molding the bottom wall of said hollow article, said bottom mold having a centrally and inwardly raised portion for forming the bottom wall of said hollow article with an internally convex configuration and wherein said bottom mold is connected with bottom mold drive/control means for receiving the driving force from said single power source to move said bottom mold vertically along said pivot shaft.

12. A blow mold as defined in claim 11, wherein said bottom mold and said first and second mold halves have pressure faces sloped substantially with the same angle and wherein when said internal chamber is defined by said first and second mold halves and said bottom mold, said bottom mold is self-centered by bringing said pressure faces into engagement with each other.

13. A blow mold as defined in claim 11, wherein said bottom mold drive/control means comprises:
- a slider block reciprocatable with said control slider;
- a drive cam formed in said slider block;
- a control cylinder having a cam follower driven by said drive cam, said control cylinder being reversibly rotatable through the reciprocation of said slider block;
- a bottom mold drive/control cam formed in the camming face of said control cylinder; and
- a bottom mold drive lever having a pivot point at its middle between the opposite ends, said lever having one end on which a cam follower driven by said bottom mold drive/control cam is formed, the other end of said lever movable vertically with said bottom mold.

14. A blow mold as defined in claim 13, wherein said bottom mold and said first and second mold halves have pressure faces sloped substantially with the same angle and wherein when said internal chamber is defined by said first and second mold halves and said bottom mold, said bottom mold is self-centered by bringing said pressure faces into engagement with each other.

* * * * *